(12) United States Patent
Saito et al.

(10) Patent No.: US 10,389,279 B2
(45) Date of Patent: Aug. 20, 2019

(54) CONTROLLER OF ROTARY ELECTRIC MACHINE

(71) Applicant: Mitsubishi Electric Corporation, Tokyo (JP)

(72) Inventors: Hiroyuki Saito, Tokyo (JP); Hideaki Tani, Tokyo (JP); Yasufumi Ogawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/746,011

(22) PCT Filed: Dec. 24, 2015

(86) PCT No.: PCT/JP2015/085974
§ 371 (c)(1),
(2) Date: Jan. 19, 2018

(87) PCT Pub. No.: WO2017/109884
PCT Pub. Date: Jun. 29, 2017

(65) Prior Publication Data
US 2019/0006968 A1 Jan. 3, 2019

(51) Int. Cl.
*H02P 6/08* (2016.01)
*H02P 6/10* (2006.01)
*H02P 29/60* (2016.01)

(52) U.S. Cl.
CPC ............ *H02P 6/10* (2013.01); *H02P 6/08* (2013.01); *H02P 29/60* (2016.02)

(58) Field of Classification Search
CPC .... H02P 1/00; H02P 1/423; H02P 1/24; H02P 1/26; H02P 1/46; H02P 1/465; H02P 4/00;
(Continued)

(56) References Cited

U.S. PATENT DOCUMENTS

| 5,469,215 A | 11/1995 | Nashiki |
| 7,429,847 B2 * | 9/2008 | Yamada .................. B60L 15/02 318/432 |

(Continued)

FOREIGN PATENT DOCUMENTS

| JP | 07-046878 A | 2/1995 |
| JP | 2010-110067 A | 5/2010 |
| WO | 2006/121061 A1 | 11/2006 |

OTHER PUBLICATIONS

International Search Report for PCT/JP2015/085974 dated Mar. 1, 2016.

*Primary Examiner* — Antony M Paul
(74) *Attorney, Agent, or Firm* — Sughrue Mion, PLLC; Richard C. Turner

(57) ABSTRACT

To provide a controller of a rotary electric machine which can prevent the vibration torque component to be outputted by the rotary electric machine from being upper-limited by the maximum output torque of the rotary electric machine. A controller of a rotary electric machine decreases an amplitude of the vibration torque command value so that a vibration maximum value obtained by adding an amplitude of a vibration torque command value to a basic torque command value becomes less than or equal to an upper limit command value; and calculates a value obtained by upper-limiting an addition torque command value, which is obtained by adding the vibration torque command value to the basic torque command value, by the upper limit command value, as a final torque command value.

11 Claims, 6 Drawing Sheets

(58) Field of Classification Search
CPC ...... H02P 5/00; H02P 6/00; H02P 6/04; H02P 6/08; H02P 6/10; H02P 8/18; H02P 21/00; H02P 21/148; H02P 23/00; H02P 23/0004; H02P 25/08; H02P 27/00; H02P 27/02; H02P 27/04; H02P 27/06; H02K 29/06
USPC ............ 318/400.23, 400.01, 400.02, 400.14, 318/400.15, 700, 701, 727, 779, 799, 800, 318/801, 430, 432, 437
See application file for complete search history.

(56) References Cited

U.S. PATENT DOCUMENTS

| | | | |
|---|---|---|---|
| 8,446,118 B2 * | 5/2013 | Kinugasa | B60L 15/025 318/400.23 |
| 2008/0116832 A1 | 5/2008 | Yamada et al. | |

* cited by examiner

CONTROLLER OF ROTARY ELECTRIC MACHINE

CROSS REFERENCE TO RELATED APPLICATIONS

This application is a National Stage of International Application No. PCT/JP2015/085974 filed Dec. 24, 2015, the contents of all of which are incorporated herein by reference in their entirety.

TECHNICAL FIELD

The present disclosure relates to a controller of a rotary electric machine which superimposes a torque vibration component on output torque of the rotary electric machine.

BACKGROUND ART

In recent years, the hybrid vehicle and the electric vehicle attract attention as the environmentally friendly vehicle. The hybrid vehicle is a vehicle which uses, as its power source, the rotary electric machine in addition to the conventional internal combustion engine. That is, both of the internal combustion engine and the rotary electric machine are used for the driving force source of the wheels. The electric vehicle is a vehicle which uses, as its driving force source, the rotary electric machine. However, a torque vibration component, such as a torque ripple, is superimposed on the rotary electric machine, and the vibration component may be transmitted to the wheels. At the time of vehicle start, deceleration, very low speed running, and the like, there is a possibility of giving discomfort to a driver by vibration. In the technology disclosed in PTL 1, it is configured to make the rotary electric machine output the vibration torque for canceling the torque vibration component.

CITATION LIST

Patent Literature

PTL 1: JPH07-046878 A

SUMMARY OF INVENTION

Technical Problem

However, the torque that the rotary electric machine can output has a limit due to magnetic saturation and the like, and the maximum output torque of the rotary electric machine is fixed. Accordingly, when the rotary electric machine is made to output the vibration torque is a state where the output torque of the rotary electric machine increases to near the maximum output torque, there is a case where a mountain part of the vibration torque component is upper-limited by the maximum output torque and the rotary electric machine cannot be made to output the mountain part. On the other hand, since a valley part of the vibration torque component is not upper-limited by the maximum output torque, the rotary electric machine can be made to output the valley part directly. Accordingly, an average value of the output torque of the rotary electric machine decreases by the upper-limited mountain part of the vibration torque component. Therefore, when the output torque of the rotary electric machine is made to increase to near the maximum output, torque and the vehicle is made to accelerate, there was a problem that the output torque decreases.

Thus, it is desirable to provide a controller of a rotary electric machine which can prevent the vibration torque component to be outputted by the rotary electric machine from being upper-limited by the maximum output torque of the rotary electric machine.

Solution to Problem

A controller of a rotary electric machine according to the present disclosure including:

a basic torque command calculation unit that calculates a basic torque command value which is a basic command value of torque in which the rotary electric machine is made to output;

a vibration command calculation unit that calculates a vibration torque command value which is a torque command value which vibrates at a vibration frequency; and a final torque command calculation unit that calculates an addition torque command value obtained by adding the vibration torque command value to the basic torque command value; and calculates a value obtained by upper-limiting the addition torque command value by an upper limit command value which is preliminarily set corresponding to a maximum output torque of the rotary electric machine, as a final torque command value to be commanded to the rotary electric machine finally, wherein when a vibration maximum value obtained by adding an amplitude of the vibration torque command value to the basic torque command value becomes larger than the upper limit command value, the vibration command calculation unit decreases the amplitude of the vibration torque command value so that the vibration maximum value becomes less than or equal to the upper limit command value.

Advantage of Invention

According to the controller of the rotary electric machine of the present disclosure, since the amplitude of the vibration torque command value superimposed on the final torque command value is decreased, the vibration torque command value is not upper-limited by the upper limit command value which is set corresponding to the maximum output torque of the rotary electric machine. Accordingly, the average value of the final torque command value and the average value of the output torque of the rotary electric machine can be prevented from becoming lower than the basic torque command value.

DETAILED DESCRIPTION OF THE EMBODIMENTS

1. Embodiment 1

Figure 1:
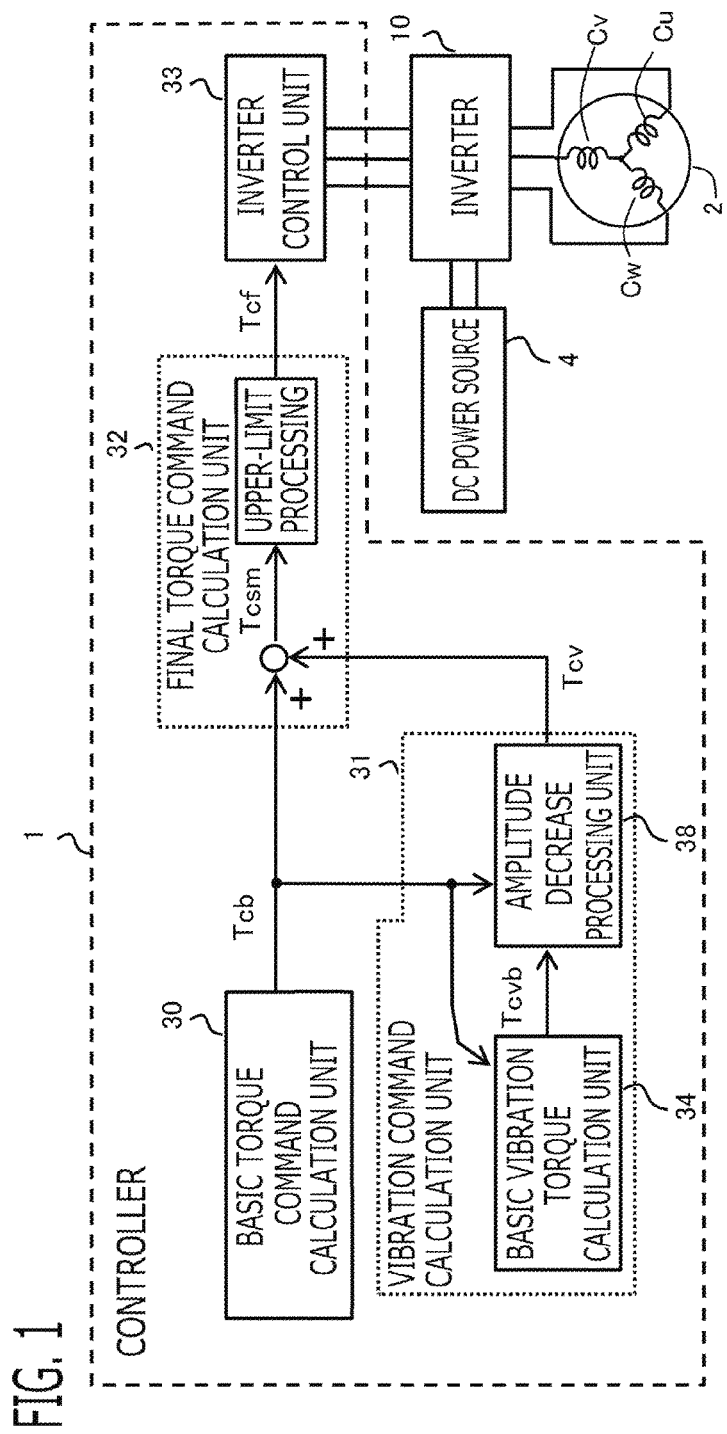
FIG. 1 is a schematic block diagram of a controller of a rotary electric machine according to Embodiment 1 of the present disclosure.

A controller 1 of a rotary electric machine 2 (hereinafter, referred to simply as the controller 1) according to Embodiment 1 will be explained with reference to drawings. FIG. 1 is a schematic block diagram of the controller 1 according to the present embodiment.

The rotary electric machine 2 is provided with a stator fixed to a nonrotation member, and a rotor which is disposed at radial-direction inner side of the stator and is pivotably supported by a nonrotation member. In the present embodiment, the rotary electric machine 2 is a rotary machine of the permanent magnet synchronous type, the stator is provided with three-phase windings Cu, Cv, Cw, and the rotor is provided with permanent magnets. The rotary electric machine 2 is electrically connected to a DC power source 4 via an inverter 10 which performs a DC/AC conversion. The rotary electric machine 2 has at least the function of an electric motor which receives electric power supply from the DC power source 4 and generates power. The rotary electric machine 2 may have the function of a generator in addition to the function of the electric motor.

The inverter 10 is a DC/AC conversion device that performs electric power conversion between the DC power source 4 and the rotary electric machine 2. The inverter 10 is configured into a bridge circuit in which three sets of two switching devices, which are connected in series between a positive pole wire connected to a positive pole of the DC power source 4 and a negative pole wire connected to a negative pole of the DC power source 4, are provided correspondingly to the windings of each phase of three phases (U phase, V phase, W phase). A connection node, which connects the positive pole side switching device and the negative pole side switching device in series, is connected to the winding of the corresponding phase. An IGBT (Insulated Gate Bipolar Transistor) in which a free wheel diode is connected in reversely parallel, a MOSFET (Metal Oxide Semiconductor Field Effect Transistor), and the like are used for the switching device. The inverter 10 is provided with a current sensor 11 for detecting current which flows into each winding. The current sensor 11 is provided on the each phase wire which connects the series circuit of the switching devices and the winding.

Figure 2:
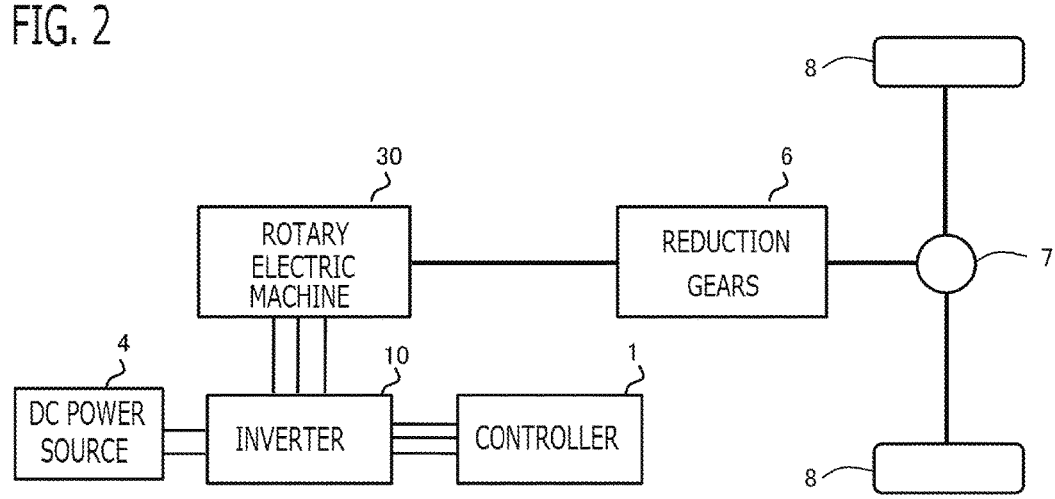
FIG. 2 is a schematic configuration diagram of a vehicle equipped with a rotary electric machine and a controller according to Embodiment 1 of the present disclosure.

In the present embodiment, as shown in FIG. 2, the rotary electric machine 2 serves as a driving force source of a vehicle; and a rotating shaft of the rotor of the rotary electric machine 2 is coupled to right and left two wheels 8 via reduction gears 6 and a differential gear 7.

Figure 3:
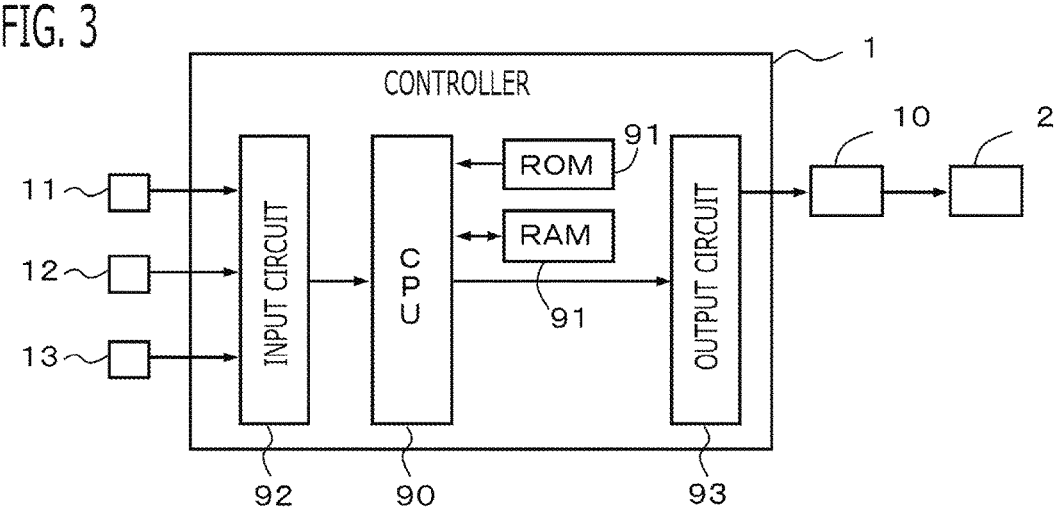
FIG. 3 is a hardware configuration diagram of a rotary electric machine according to Embodiment 1 of the present disclosure.

The controller 1 is a controller which controls the rotary electric machine 2 by controlling the inverter 10. As shown in FIG. 1, the controller 1 is provided with functional parts of a basic torque command calculation unit 30, a vibration command calculation unit 31, a final torque command calculation unit 32, an inverter control unit 33, and the like. Respective control units 30 through 33 and the like provided in the controller 1 are realized by processing circuits included in the controller 1. Specifically, as shown in FIG. 3, the controller 1 is provided, as the processing circuits, with a calculation processor (computer) 90 such as a CPU (Central Processing Unit) and a DSP (Digital Signal Processor), storage apparatuses 91 that exchange data with the calculation processor 90, an input circuit 92 that inputs external signals to the calculation processor 90, an output circuit 93 that outputs signals from the calculation processor 90 to the outside, and the like. As the storage apparatuses 91, there are provided a RAM (Random Access Memory) which can read data and write data from the calculation processor 90, a ROM (Read Only Memory) which can read data from the calculation processor 90, and the like. The input circuit 92 is connected with various kinds of sensors and switches and is provided with an A/D converter and the like for inputting output signals from the sensors and the switches to the calculation processor 90. The output circuit 93 is connected with electric loads such as the switching devices, and is provided with a driving circuit and the like for outputting a control signal from the calculation processor 90. In the present embodiment, the input circuit 92 is connected to the current sensor 11, a rotational speed sensor 12, a temperature sensor 13, and the like. The output circuit 93 is connected to the inverter 10 (switching devices or a gate driving circuit of the switching devices).

Then, the calculation processor 90 runs software items (programs) stored in the storage apparatus 91 such as a ROM and collaborates with other hardware devices in the controller 1, such as the storage apparatus 91, the input circuit 92, and the output circuit 93, so that the respective functions of the control units 30 through 33 included in the controller 1 are realized. Setting data items such as determination value and table to be utilized in the control units 30 through 33 are stored, as part of software items (programs), in the storage apparatus 91 such as a ROM. Each function of the controller 1 will be described in detail below.

Figure 4:
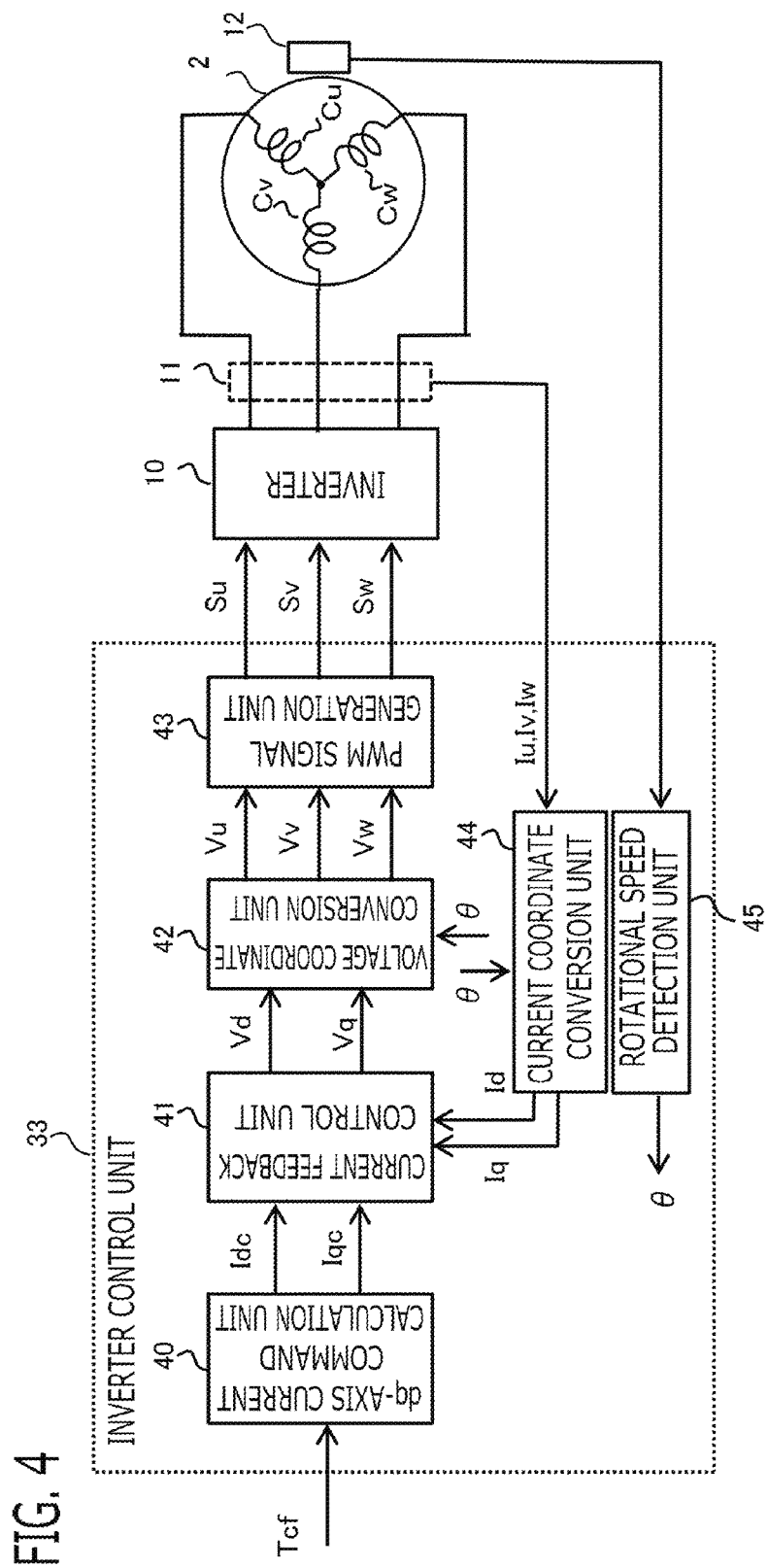
FIG. 4 is a block diagram of an inverter control unit according to Embodiment 1 of the present disclosure.

As shown in the block diagram of FIG. 4, the inverter control unit 33 controls on/off of the switching devices of the inverter 10 so that the rotary electric machine 2 outputs a torque of a final torque command value Tcf transmitted from the final torque command calculation unit 32 described below. In the present embodiment, the inverter control unit 33 performs current feedback control using a vector control method. The inverter control unit 33 is provided with a dq-axis current command calculation unit 40, a current feedback control unit 41, a voltage coordinate conversion unit 42, a PWM signal generation unit 43, a current coordinate conversion unit 44, and a rotational speed detection unit 45.

The rotational speed detection unit 45 detects a rotational speed of the rotary electric machine 2. The rotational speed detection unit 45 detects an electrical angle θ (magnetic pole position θ) of the rotor and an electrical angular speed, based on the output signal of the rotational speed sensor 12 provided in the rotation shaft of the rotor.

The final torque command value Tcf calculated by the final torque command calculation unit 32 is inputted into the dq-axis current command calculation unit 40. The dq-axis current command calculation unit 40 calculates a d-axis current command value Idc and a q-axis current command value Iqc, in which currents that flow through the three phase windings Cu, Cv, Cw are expressed in a dq-axis rotating coordinate system, in order to make the rotary electric machine 2 output a torque of the final torque command value Tcf. The dq-axis current command calculation unit 40 calculates the dq-axis current command values Idc, Iqc according to a current vector control method, such as maximum torque current control, magnetic flux weakening control, Id=0 control, and maximum torque magnetic flux control. In the maximum torque current control, the dq-axis current command values Idc, Iqc which maximize the generated torque for the same current are calculated. In the magnetic flux weakening control, the dq-axis current command values Idc, Iqc are moved on a constant induced voltage ellipse according to the final torque command value Tcf. In the Id=0 control, the d-axis current command value Idc is set to zero, and the q-axis current command value Iqc is changed according to the final torque command value Tcf and the like. In the maximum torque magnetic flux control, the dq-axis current command values Idc, Iqc in which a flux linkage is minimized for the same torque generation are calculated. In the present embodiment, by referring to a torque current conversion map in which a relationship between the final torque command value Tcf and the dq-axis current command values Idc, Iqc is preliminarily set, the dq-axis current command calculation unit 40 calculates the dq-axis current command values Idc, Iqc corresponding to the final torque command value Tcf.

The dq-axis rotating coordinate system consists of a d-axis defined in the direction of the N pole (magnetic pole position) of the permanent magnet provided in the rotor and a q-axis defined in the direction advanced to d-axis by 90 degrees ($\pi/2$) in an electrical angle, and which is the two-axis rotating coordinate system which rotates synchronizing with rotation of the rotor in the electrical angle $\theta$.

The current coordinate conversion unit 44 detects three phase currents Iu, Iv, Iw which flow through the respective phase windings Cu, Cv, Cw of the rotary electric machine 2 from the inverter 10, based on the output signal of the current sensor 11. The current coordinate conversion unit 44 converts three phase currents Iu, Iv, Iw, which flow into the windings of respective phases, into a d-axis current Id and a q-axis current Iq which are expressed in the dq axial rotation coordinate system, by performing a three-phase/two-phase conversion and a rotating coordinate conversion based on the magnetic pole position $\theta$.

The current feedback control unit 41 performs current feedback control which changes a d-axis voltage command value Vd and a q-axis voltage command value Vq, in which voltage command signals applied to the rotary electric machine 2 are expressed in the dq-axis rotating coordinate system, by PI control or the like so that the dq-axis currents Id, Iq approach to the dq-axis current command values Idc, Iqc. Then, the voltage coordinate conversion unit 42 converts the dq-axis voltage command values Vd, Vq into three-phase AC voltage command values Vu, Vv, Vw which are AC voltage command values to the respective three phase windings, by performing a fixed coordinate conversion and a two-phase/three-phase conversion based on the magnetic pole position $\theta$.

The PWM signal generation unit 43 compares each of the three-phase AC voltage command values Vu, Vv, Vw with a carrier wave (a triangular wave) which has an vibration width of a DC power source voltage and vibrates at a carrier frequency; and then turns on a rectangular pulse wave when the AC voltage command value exceeds the carrier wave, and turns off the rectangular pulse wave when the AC voltage command value bellows the carrier wave. The PWM signal generation unit 43 outputs the rectangular pulse waves of respective three phases as inverter control signals Su, Sv, Sw of respective three phases to the inverter 10, and turns on/off the respective switching devices of the inverter 10.

Next, calculation of the final torque command value Tcf will be explained. As shown in FIG. 1, the basic torque command calculation unit 30 calculates a basic torque command value Tcb which is a basic command value of torque to be outputted by the rotary electric machine 2. In the present embodiment, the basic torque command calculation unit 30 calculates a vehicle demand torque required for driving the wheels W according to an accelerator opening degree, a vehicle speed, a charge amount, of the DC power source 4, and the like, and sets the basic torque command value Tcb based on the vehicle demand torque.

The vibration command calculation unit 31 calculates a vibration torque command value Tcv which is a torque command value which vibrates at a vibration frequency. In the present embodiment, the vibration command calculation unit 31 is provided with a basic vibration torque calculation unit 34 and an amplitude decrease processing unit 38. The basic vibration torque calculation unit 34 calculates a basic vibration torque command value Tcvb which is a basic value of the vibration torque command value. The amplitude decrease processing unit 38 calculates the final vibration torque command value Tcv by performing amplitude decrease processing described below to the basic vibration torque command value Tcvb.

The basic vibration torque calculation unit 34 sets the vibration frequency to a frequency corresponding to a rotational frequency (electrical angle frequency) of the rotary electric machine 2. The basic vibration torque command value Tcvb is a torque command value for canceling a torque vibration component, such as a torque ripple and a cogging torque, which occurs in the output torque of the rotary electric machine 2, and is set to a torque with an opposite phase to a torque vibration component. The torque ripple occurs by interaction between magnetic flux by the current and magnetic flux by the magnet, and becomes a frequency of 6n times (n is a natural number of greater than or equal to 1) as much as a fundamental frequency (electrical angle frequency) of the current. The cogging torque occurs by a change of static magnetic attraction force between the stator and the rotor according to a rotor position, and becomes a frequency obtained by multiplying an electrical angle frequency and a least common multiple of a slot number of the stator and a pole number of the rotor.

In the present embodiment, as shown in the equation (1), the basic vibration torque calculation unit 34 calculates, as the basic vibration torque command value Tcvb, a sine wave (or cosine wave) which has a basic amplitude Ab, vibrates at a vibration frequency which is an order m (m is a natural number of greater than or equal to 1) of the electrical angle frequency, and has difference of a phase $\gamma$ to m times of the electrical angle $\theta$.

$$Tcvb = Ab \times \sin(m \times \theta + \gamma) \quad (1)$$

Figure 5:
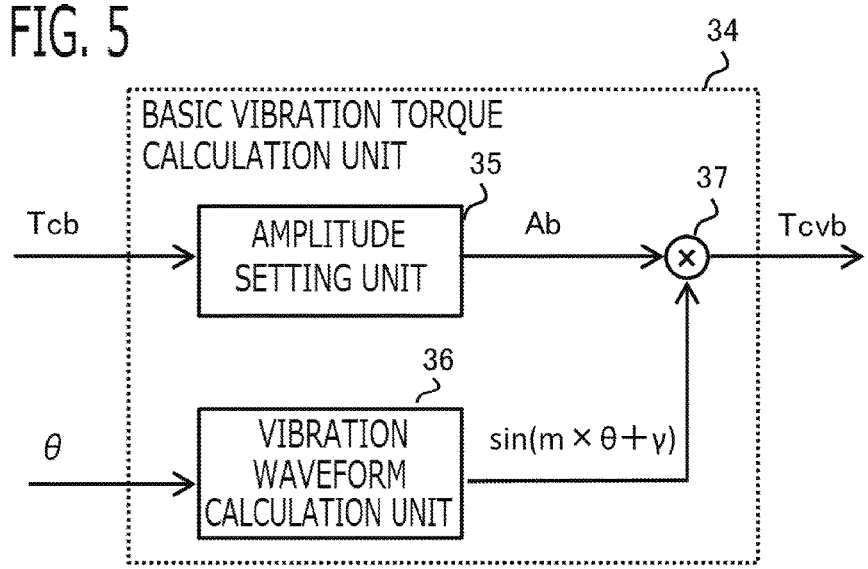
FIG. 5 is a block diagram of a basic vibration torque calculation unit according to Embodiment 1 of the present disclosure.
Figure 6:
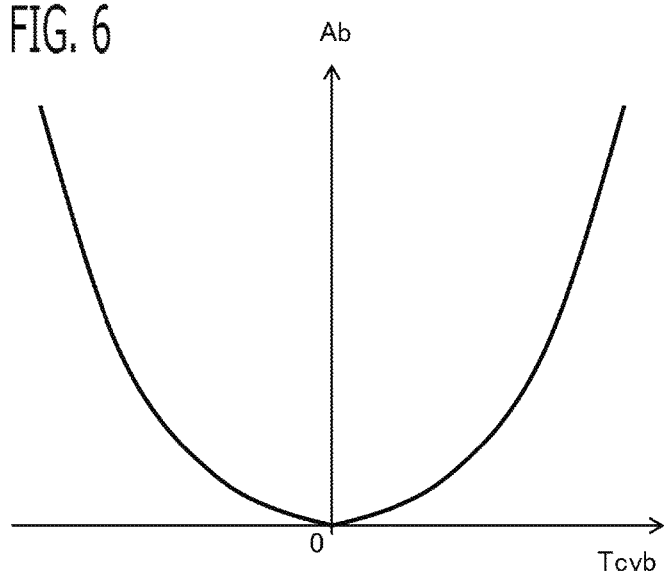
FIG. 6 is a figure for explaining an amplitude table according to Embodiment 1 of the present disclosure.

As shown in the block diagram of FIG. 5, the basic vibration torque calculation unit 34 is provided with an amplitude setting unit 35, a vibration waveform calculation unit 36, and a multiplier 37. The amplitude setting unit 35 sets the basic amplitude Ab based on the basic torque command value Tcb. In this example, by use of amplitude table in which a relationship between the basic torque command value Tcb and the basic amplitude Ab is preliminarily set as shown in FIG. 6, the amplitude setting unit 35 calculates the basic amplitude Ab corresponding to the basic torque command value Tcb calculated by the basic torque command calculation unit 30.

The vibration waveform calculation unit 36 calculates a vibration waveform based on the electrical angle $\theta$ detected by the rotational speed detection unit 45, the preliminarily set order m, and the preliminarily set phase γ. In this example, the vibration waveform calculation unit 36 calculates sin (m×θ+γ) as the vibration waveform. The vibration waveform calculation unit 36 may change the phase γ according to operating conditions, such as the basic torque command value Tcb and the electrical angle speed. Then, the multiplier 37 calculates a basic vibration torque command value Tcvb by multiplying the basic amplitude Ab set by the amplitude setting unit 35 and the vibration waveform sin (m×θ+γ) calculated by the vibration waveform calculation unit 36.

An example of a setting method of the amplitude table and the phase γ will be explained. When the vibration torque command value Tcv for canceling the torque vibration is not superimposed on the basic torque command value Tcb, the output torque of the rotary electric machine 2 is measured by a torque sensor in a plurality of operating conditions, such as the different basic torque command value Tcb. Then, the measured output torque waveform is approximated to a sin wave by a least squares method and the like. An amplitude of the approximated sin wave is set to the basic amplitude Ab, and an opposite phase to a phase of the approximated sin wave is set to the phase γ. As shown in FIG. 6, the relationship between the basic torque command value Tcb and the basic amplitude Ab is preliminarily set as the amplitude table.

As an absolute value of the basic torque command value Tcb becomes large, the amplitude of the torque vibration, such as the torque ripple, also becomes large. Therefore, the amplitude table is set so that the basic amplitude Ab becomes large, as the absolute value of the basic torque command value Tcb becomes large. Accordingly, the torque vibration whose amplitude increases as the basic torque command value Tcb becomes large is canceled by the vibration torque command value. However, when the basic torque command value Tcb increases to near upper limit command value Tcmx described below, the vibration torque command value whose amplitude increased is upper-limited by the upper limit command value Tcmx, and a problem described below occurs.

In order to deal with a case where an order of the electrical angle frequency of the torque ripple is different from that of the cogging torque, the vibration command calculation unit 31 may calculate a plurality of basic vibration torque command values Tcvb which are different in the order m, and may calculate a total value of the plurality of basic vibration torque command values Tcvb, as the final basic vibration torque command value Tcvb.

The amplitude decrease processing unit 38 calculates the final vibration torque command value Tcv by performing amplitude decrease processing described below to the basic vibration torque command value Tcvb.

As shown in FIG. 1, the final torque command calculation unit 32 calculates an addition torque command value Tcsm obtained by adding the vibration torque command value Tcv calculated by the vibration command calculation unit 31 to the basic torque command value Tcb calculated by the basic torque command calculation unit 30; and calculates a value obtained by upper-limiting the addition torque command value Tcsm by an upper-limit command value Tcmx which is preliminarily set corresponding to the maximum output torque of the rotary electric machine 2, as the final torque command value Tcf to be finally commanded to the rotary electric machine 2.

Here, the maximum output torque of the rotary electric machine 2 is a maximum value of an average value of the output torque in which the controller 1 can make the rotary electric machine 2 output, and becomes an output torque in which the torque vibration components, such as the torque ripple and the cogging torque, are averaged. That is to say, the maximum output torque is a maximum average output torque. In the present embodiment, the upper-limit command value Tcmx is set so as to coincide with the maximum output torque of the rotary electric machine 2. The maximum output torque of the rotary electric machine 2 changes according to the electrical angle speed of the rotor, the power source voltage of the DC power source 4, the charge amount, and the like. The final torque command calculation unit 32 sets the upper-limit command value Tcmx based on the electrical angle speed of the rotor the power source voltage of the DC power source 4, and the charge amount.

As shown in the equation (2), when the addition torque command value Tcsm obtained by adding the vibration torque command value Tcv to the basic torque command value Tcb is larger than the maximum command value Tcmx, the final torque command calculation unit 32 sets the upper-limit command value Tcmx to the final torque command value Tcf. On the other hand, when the addition torque command value Tcsm is less than or equal to the upper limit command value Tcmx, the final torque command calculation unit 32 sets the addition torque command value Tcsm to the final torque command value Tcf.

{1} In the case of $Tcsm(=Tcb+Tcv)>Tcmx$ $Tcf=Tcmx$

2) In the case of $Tcsm(=Tcb+Tcv)<=Tcmx$ $$Tcf=Tcsm=Tcb+Tcv \qquad (2)$$

Here, a comparative example configured not to perform amplitude decrease processing by an amplitude decrease processing unit 38 described below unlike the present embodiment will be explained. As shown in the time chart of FIG. 7, in a state where the basic torque command value Tcb rises to near the maximum command value Tcmx, when an addition torque command value Tcsm is calculated by adding the vibration torque command value Tcv (the basic vibration torque command value Tcvb), to which amplitude decrease processing is not performed, to the basic torque command value Tcb, the addition torque command value Tcsm is upper-limited by the upper-limit command value Tcmx, and becomes a state where a mountain part of the vibration torque command value Tcv, which is vibrating, is cut off. Accordingly, an average value Tcfave of the final torque command value Tcf after upper limitation becomes lower than the basic torque command value Tcb.

Figure 8:
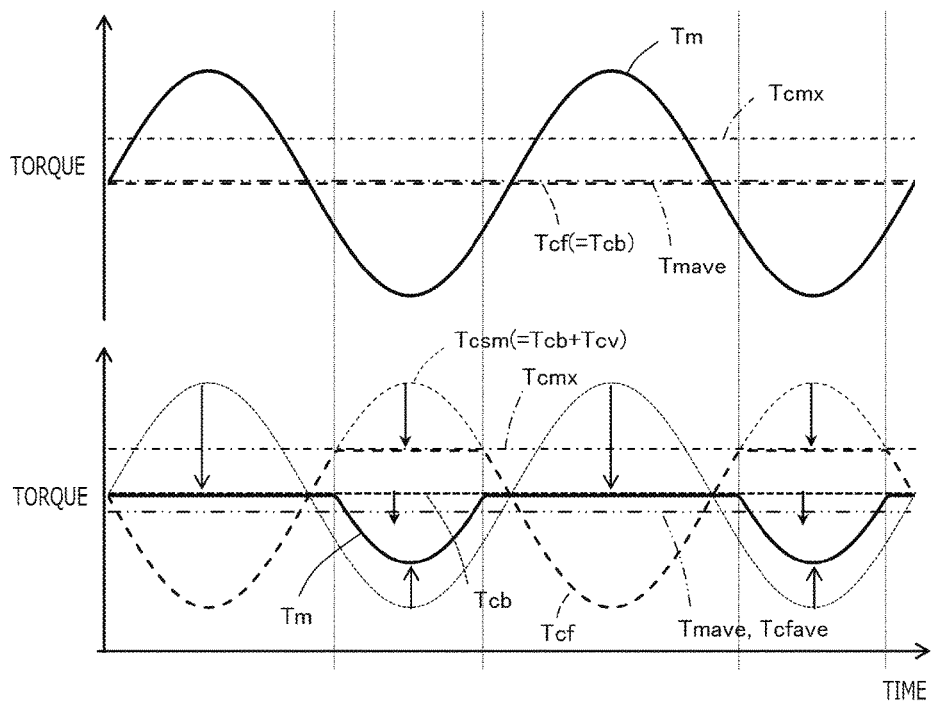
FIG. 8 is a time chart according to a comparative example of the present disclosure.

The time chart of FIG. 8 shows a behavior of an output torque Tm of the rotary electric machine 2 according to the comparative example. The time chart of the upper row of FIG. 8 is a behavior of the output torque Tm of the rotary electric machine 2 in the case of setting the basic torque command value Tcb to the final torque command value Tcf directly unlike the present embodiment, without adding the vibration torque command value Tcv to the basic torque command value Tcb. The output torque Tm of the rotary electric machine 2 becomes a waveform in which torque vibration component such as the torque ripple is superimposed on the basic torque command value Tcb. Although an average value Tmave of the output torque Tm of the rotary electric machine 2 is less than the upper-limit command value Tcmx (the maximum output torque), the mountain part of the torque vibration component of the output torque Tm exceeds the upper-limit command value Tcmx.

Figure 7:
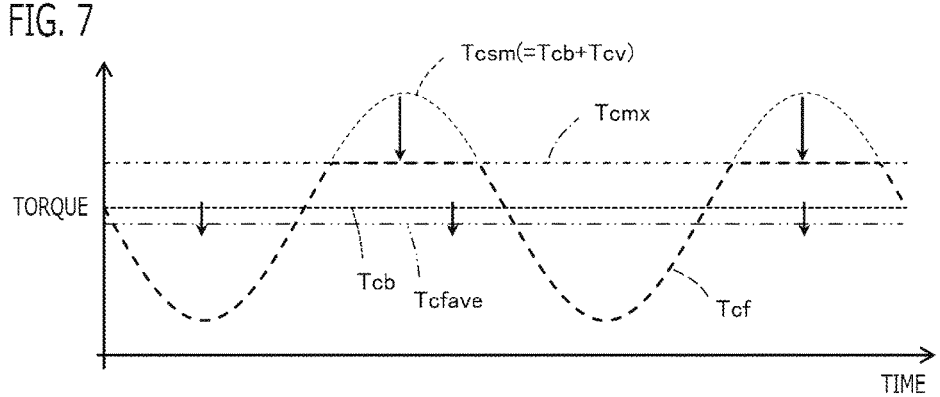
FIG. 7 is a time chart according to a comparative example of the present disclosure.

The time chart of the lower row of FIG. 8 is a behavior of the output torque Tm of the rotary electric machine 2 corresponding to the comparative example of FIG. 7. The mountain part of the torque vibration component of the output torque Tm is canceled by the valley part of the vibration torque command value Tcv which is not upper-limited, and is reduced to the basic torque command value Tcb. On the other hand, since the mountain part of the vibration torque command value Tcv is upper-limited, the valley part of the torque vibration component of the output torque Tm is not canceled enough, and becomes lower than the basic torque command value Tcb. Accordingly, the average value Tmave of the output torque Tm of the rotary electric machine 2 becomes lower than the basic torque command value Tcb. Therefore, in the comparative example, when the output torque Tm of the rotary electric machine 2 is made to increase to near the upper-limit command value Tcmx and a vehicle is made to accelerate, there is a problem that the output torque Tm drops.

Accordingly, in the present embodiment, when the vibration maximum value obtained by adding the amplitude of the vibration torque command value Tcv to the basic torque command value Tcb becomes larger than the upper limit command value Tcmx, the vibration command calculation unit 31 (the amplitude decrease processing unit 38) performs amplitude decrease processing that decreases the amplitude of the vibration torque command value Tcv so that the vibration maximum value becomes less than or equal to the upper limit command value Tcmx.

Figure 9:
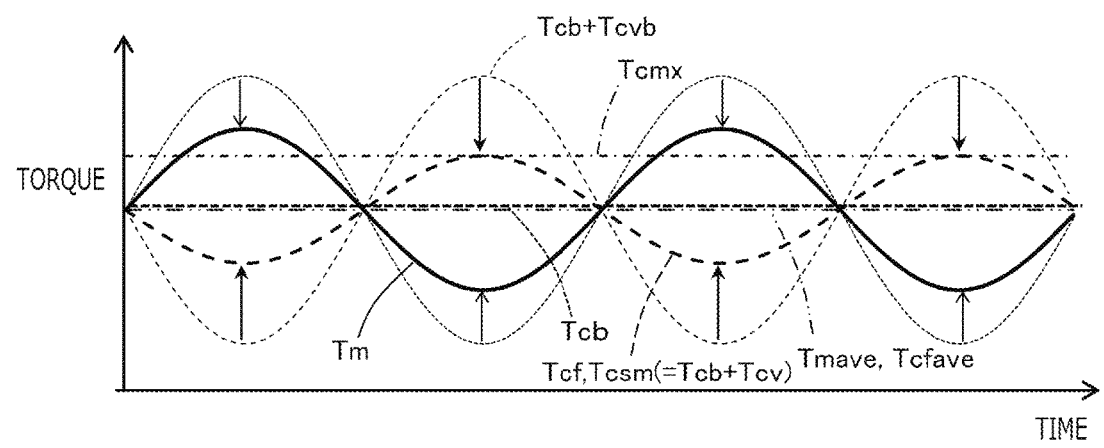
FIG. 9 is a time chart according to Embodiment 1 of the present disclosure.

According to this configuration, as shown in the time chart of FIG. 9, the addition torque command value Tcsm obtained by adding the vibration torque command value Tcv after amplitude decrease processing to the basic torque command value Tcb becomes less than or equal to the upper-limit command value Tcmx, and is not upper-limited by the upper-limit command value Tcmx. Therefore, the average value Tcfave of the final torque command value Tcf and the average value Tmave of the output torque Tm of the rotary electric machine 2 can be prevented from becoming lower than the basic torque command value Tcb. Within a range which is not upper-limited by the upper limit command value Tcmx, the amplitude of the vibration torque command value Tcv can be set and the torque vibration component can be canceled.

In the present embodiment, when the determination vibration maximum value (Tcb+Ab) obtained by adding the basic amplitude Ab of the basic vibration torque command value Tcvb to the basic torque command value Tcb is larger than the upper limit command value Tcmx, the amplitude decrease processing unit 38 decreases the amplitude of the vibration torque command value Tcv so that the vibration maximum value obtained by adding the amplitude of the vibration torque command value Tcv to the basic torque command value Tcb coincides with the upper limit command value Tcmx. According to this configuration, a decrease of the amplitude of the vibration torque command value Tcv can be necessarily minimized, and a decrease of the reduction effect of torque vibration can be necessarily minimized.

When the amplitude of the vibration torque command value Tcv is set to A, it may set to A=Tcmx−Tcb so as to become Tcb+A=Tcmx. That is to say, the amplitude A of the vibration torque command value Tcv may be set to a difference value (Tcmx-Tcb) obtained by subtracting the basic torque command value Tcb from the upper-limit command value Tcmx. Specifically, as shown in the equation (3), when the determination vibration maximum value (Tcb+Ab) obtained by adding the basic amplitude Ab of the basic vibration torque command value Tcvb to the basic torque command value Tcb is larger than the upper-limit command value Tcmx, the amplitude decrease processing unit 38 calculates an amplitude decrease coefficient Ka by dividing the difference value (Tcmx-Tcb) by the basic amplitude Ab, and calculates the final vibration torque command value Tcv by multiplying the amplitude decrease coefficient Ka to the basic vibration torque command value Tcvb. On the other hand, when the determination vibration maximum value (Tcb+Ab) is less than or equal to the upper limit command value Tcmx, the amplitude decrease processing unit 38 sets the basic vibration torque command value Tcvb to the final vibration torque command value Tcv directly.

1) In the case of $Tcb+Ab>Tcmx$ $$Ka=(Tcmx-Tcb)/Ab$$

$$Tcv=Ka \times Tcvb$$

2) in the case of $Tcb+Ab<=Tcmx$ $$Tcv=Tcvb \quad (3)$$

Alternatively, as shown in the equation (4), when the determination vibration maximum value (Tcb+Ab) is larger than the upper-limit command value Tcmx, the amplitude decrease processing unit 38 may use a difference value (Tcmx-Tcb) instead of the basic amplitude Ab in the equation (1), and may calculate the final vibration torque command value Tcv directly.

1) In the case of $Tcb+Ab>Tcmx$ $$Tcv=(Tcmx-Tcb) \times \sin(m \times \theta + \gamma)$$

2) In the case of $Tcb+Ab<=Tcmx$ $$Tcv=Ab \times \sin(m \times \theta + \gamma) \quad (4)$$

In the case where the total value of the plurality of basic vibration torque command values Tcvb which are different in the order m is set to the final basic vibration torque command value Tcvb, the amplitude decrease processing unit 38 sets an amplitude of the total value to the basic amplitude Ab, and performs calculation of the equation (3).

By the way, when the basic torque command value Tcb is rapidly changed due to a rapid change of driving condition, and disturbance such as noise, the amplitude of the vibration torque command value Tcv calculated according to the basic torque command value Tcb is also rapidly changed. For example, the current detecting value detected by the current sensor 11 changes rapidly due to noise, and thereby the basic torque command value Tcb is rapidly changed. When the amplitude of the vibration torque command value Tcv is rapidly changed, the output torque of the rotary electric machine 2 also changes rapidly; and thereby a torque variation is transmitted to the wheels 8 and a discomfort is given to a driver.

Then, in the present embodiment, the vibration command calculation unit 31 performs low pass filter processing to a setting value of the amplitude of the vibration torque command value Tcv. According to this configuration, rapid change of the amplitude of the vibration torque command value Tcv is suppressed, and torque fluctuation can be suppressed from being transmitted to the wheels 8. In the case of calculating, the vibration torque command value Tcv using the equation (1) and the equation (3), the vibration command calculation unit 31 performs low pass filter processing to the basic amplitude Ab and a setting value of the amplitude decrease coefficient Ka. Alternatively, in the case of calculating the vibration torque command value Tcv using the equation (4), the vibration command calculation unit 31 performs low pass filter processing to the difference value (Tcmx−Tcb) and the basic amplitude Ab.

2. Embodiment 2

Next, the controller 1 according to Embodiment 2 will be explained. The explanation for constituent parts the same as those in Embodiment 1 will be omitted. Although the basic configuration and processing of the rotary electric machine 2 and the controller 1 according to the present embodiment are the same as those of Embodiment 1, the calculation method of the vibration maximum value in amplitude decrease processing is different.

A deviation occurs between the final torque command value Tcf and the actual output torque of the rotary electric machine 2. For example, when the final torque command value Tcf is transformed into the dq-axis current command values Idc, Iqc by using the torque current conversion map, a transformation error occurs by a linear interpolation of an interpolation or extrapolation. There is individual difference due to production variation in the rotary electric machine 2. If coil length is different, since coil resistance is different, even if applied voltage is the same, current value is different, and output torque is different. For example, in a torque range of 0 to 300 Nm, the output torque of the rotary electric machine 2 may deviate to the final torque command value Tcf within a range of about +2 Nm to −2 Nm.

Accordingly, a deviation occurs between the maximum output torque of the rotary electric machine 2 and the upper-limit command value Tcmx. Especially in the case where the upper limit command value Tcmx deviates so as to exceed the maximum output torque of the rotary electric machine 2, even when the mountain part of the vibration torque command value Tcv included in the final torque command value Tcf is not upper-limited by the maximum command value Tcmx, actually, there is a case where the mountain part is upper-limited by the maximum output torque of the rotary electric machine 2, and the rotary electric machine 2 cannot be made to output torque of the mountain part of the vibration torque command value Tcv. Accordingly, it becomes a state similar to the graph of the lower row of FIG. 8, and there is a problem that the average value Tmave of the output torque Tm of the rotary electric machine 2 decreases.

Then, in the present embodiment, the vibration command calculation unit 31 calculates, as the vibration maximum value, a value obtained by adding the amplitude of the vibration torque command value Tcv, and a preliminarily set deviation width ΔTsh between the final torque command value Tcf and the output torque of the rotary electric machine 2, to the basic torque command value Tcb. That is to say, when the vibration maximum value obtained by adding the amplitude of the vibration torque command value Tcv and the deviation width ΔTsh to the basic torque command value Tcb becomes larger than the upper-limit command value Tcmx, the vibration command calculation unit 31 decreases the amplitude of the vibration torque command value Tcv so that the vibration maximum value becomes less than or equal to the upper limit command value Tcmx.

According to this configuration, the amplitude of the vibration torque command value Tcv is decreased so as to provide an interval greater than or equal to the preliminarily set deviation width. ΔTsh between the upper limit command value Tcmx and the final torque command value Tcf which is vibrating. Then, as described above, in the case where the upper limit command value Tcmx deviates so as to exceed the maximum output torque of the rotary electric machine 2, the mountain part of the vibration torque command value Tcv can be suppressed from being upper-limited by the maximum output torque of the rotary electric machine 2, and the average value Tmave of the output torque Tm of the rotary electric machine 2 can be suppressed from decreasing.

In the present embodiment, the deviation width ΔTsh is preliminarily set to a maximum deviation width that occur in one or both of a setting error of the torque current conversion map and an individual difference of the rotary electric machine 2. When a determination vibration maximum value (Tcb+Ab+ΔTsh) obtained by adding the basic amplitude Ab of the basic vibration torque command value Tcvb and the deviation width ΔTsh to the basic torque command value Tcb is larger than the upper-limit command value Tcmx, the amplitude decrease processing unit 38 decreases the amplitude of the vibration torque command value Tcv so that a vibration maximum value obtained by adding the amplitude of the vibration torque command value Tcv and the deviation width ΔTsh to the basic torque command value Tcb coincides with the upper limit command value Tcmx.

Specifically, as shown in the equation (5), when the determination vibration maximum value (Tcb+Ab+ΔTsh) is larger than the upper-limit command value Tcmx, the amplitude decrease processing unit 38 calculates the amplitude decrease coefficient Ka by dividing the deviation width subtraction difference value (Tcmx−Tcb−ΔTsh), which is obtained by subtracting the basic torque command value Tcb and the deviation width ΔTsh from the upper limit command value Tcmx, by the basic amplitude Ab; and calculates the final vibration torque command value Tcv by multiplying the amplitude decrease coefficient Ka to the basic vibration torque command value Tcvb. On the other hand, when the determination vibration maximum value (Tcb+Ab+ΔTsh) is less than or equal to the upper limit command value Tcmx, the amplitude decrease processing unit 38 sets the basic vibration torque command value Tcvb to the final vibration torque command value Tcv directly.

1) In the case of $Tcb+Ab+\Delta Tsh > Tcmx$ $Ka = (Tcmx - Tcb - \Delta Tsh)/Ab$ $Tcv = Ka \times Tcvb$ 2) In the case of $Tcb+Ab+\Delta Tsh <= Tcmx$ $Tcv = Tcvb$ \hfill (5)

Alternatively, as shown in the equation (6), when the determination vibration maximum value (Tcb+Ab+ΔTsh) is larger than the upper limit command value Tcmx, the amplitude decrease processing unit 38 may use the deviation width subtraction difference value (Tcmx−Tcb−ΔTsh) instead of the basic amplitude Ab in the equation (1), and may calculate the final vibration torque command value Tcv directly.

1) In the case of $Tcb+Ab+\Delta Tsh > Tcmx$ $Tcv = (Tcmx - Tcb - \Delta Tsh) \times \sin(m \times \theta + \gamma)$ 2) In the case of $Tcb+Ab+\Delta Tsh <= Tcmx$ $$Tcv = Ab \times \sin(m \times \theta + \gamma) \qquad (6)$$

In both cases of the equation (5) and the equation (6), the amplitude decrease processing, unit 38 lower-limits the deviation width subtraction difference value (Tcmx−Tcb−ΔTsh) by zero. According to this configuration, when the deviation width subtraction difference value (Tcmx−Tcb−ΔTsh) becomes less than or equal to zero, the amplitude of the vibration torque command value Tcv is set to zero. Accordingly, the amplitude can be prevented from being minus, and the phase of the vibration torque command value Tcv can be prevented from being reversed.

3. Embodiment 3

Next, the controller 1 according to Embodiment 3 will be explained. Description of constitutional elements similar to the above Embodiment 1 will be omitted. Although the basic configuration and processing of the rotary electric machine 2 and the controller 1 according to the present embodiment are the same as those of Embodiment 1, the calculation method of the vibration maximum value in amplitude decrease processing is different.

As explained in Embodiment 1, the controller 1 performs the current feedback control so that the current value detected by the current sensor 11 approaches the current command value which is set based on the final torque command value Tcf. So, when detection deviation occurs in the current sensor 11, deviation occurs between the final torque command value Tcf and an actual output torque of the rotary electric machine 2. Generally, since the current sensor 11 is calibrated in normal temperature, there is a possibility that the detection deviation becomes large if the current sensor 11 becomes high temperature. For example, in the case where the current, sensor 11 is a shunt type, the current value according to the voltage drop amount of the both ends of a resistor is calculated. Accordingly, since a resistance of the resistor increases and the voltage drop amount increases when the resistor becomes high temperature, a detected current value becomes larger than an actual current value. The temperature rise of the current sensor 11 occurs, when a temperature near the current sensor 11 of the inverters 10 rises, or when a current which flows through the resistor increases. For example, at the time of high ambient temperature in midsummer, high speed driving, and the like, the temperature rise of the current sensor 11 becomes large, and the current detection deviation becomes large.

If the current detection deviation is large, the deviation width between the final torque command value Tcf and the actual output torque of the rotary electric machine 2 also becomes large, and the problem explained in the above Embodiment 2 occurs. That is to say, in the case where the upper limit command value Tcmx deviates so as to exceed the maximum output torque of the rotary electric machine 2, there is a case where the rotary electric machine 2 cannot be made to output torque of the mountain part of the vibration torque command value Tcv by the upper limitation of maximum output torque, and the average value Tmave of the output torque Tm of the rotary electric machine 2 decreases.

Then, in the present embodiment, when the temperature of the current sensor 11 which detects current flowing into the rotary electric machine 2 is greater than or equal to a preliminarily set determination temperature (for example, 80° C.), the vibration command calculation unit 31 calculates a current torque deviation width ΔTshi, which is a deviation width between the final torque command value Tcf and the output torque of the rotary electric machine 2 and is caused by current detection error of the current sensor 11; and calculates a value obtained by adding the amplitude of the vibration torque command value Tcv and the current torque deviation width ΔTshi to the basic torque command value Tcb, as the vibration maximum value.

That is to say, when the temperature of the current sensor 11 is greater than or equal to the preliminarily set determination temperature, the vibration command calculation unit 31 decreases the amplitude of the vibration torque command value Tcv so that the vibration maximum value becomes less than or equal to the upper limit command value Tcmx when a vibration maximum value obtained by adding the vibration torque command value Tcv and the current torque deviation width ΔTshi to the basic torque command value Tcb becomes larger than the upper limit command value Tcmx. On the other hand, when the temperature of the current sensor 11 is less than the determination temperature, the vibration command calculation unit 31 decreases the amplitude of the vibration torque command value Tcv so that the vibration maximum value becomes less than or equal to the upper-limit command value Tcmx when the vibration maximum obtained by adding the vibration torque command value Tcv to the basic torque command value Tcb becomes larger than the maximum command value Tcmx.

According to this configuration, when the temperature of the current sensor 11 became greater than or equal to the determination temperature and the current detection deviation became large, the amplitude of the vibration torque command value Tcv is decreased so as to provide an interval greater than or equal to the current torque deviation width ΔTshi between the upper-limit command value Tcmx and the final torque command value Tcf which is vibrating. Therefore, in the case where the upper limit command value Tcmx deviates so as to exceed the maximum output torque of the rotary electric machine 2, the mountain part of the vibration torque command value Tcv can be suppressed from being upper-limited by the maximum output torque of the rotary electric machine 2, and the average value Tmave of the output torque Tm of the rotary electric machine 2 can be suppressed from decreasing. On the other hand, when the temperature of the current sensor 11 is less than the determination temperature and the current detection deviation is small, addition of the current torque deviation width ΔTshi is not performed, the amplitude of the vibration torque command value Tcv can be prevented from being decreased more than necessary, and a reduction effect of torque vibration can be improved.

In the case where the current sensor 11 has a temperature detection function, the vibration command calculation unit 31 detects the temperature of the current sensor 11 based on the output signal of the temperature sensor 13 provided in the current sensor 11. Alternatively, the vibration command calculation unit 31 detects the temperature of the current sensor 11 based on the output signal of the temperature sensor 13 provided near the current sensor 11.

The current torque deviation width ΔTshi may be a preliminarily set constant value, or may be changed according to the temperature of the current sensor 11. In the latter case, by use of a deviation width setting table in which the relationship between the temperature of the current sensor 11 and the current torque deviation width ΔTshi is preliminarily set, the vibration command calculation unit 31 calculates the current torque deviation width ΔTshi corresponding to the detected temperature of the current sensor 11.

When the determination vibration maximum value (Tcb+Ab+ΔTshi) obtained by adding the basic amplitude Ab of the basic vibration torque command value Tcvb and the current torque deviation width ΔTshi to the basic torque command value Tcb is larger than the upper limit command value Tcmx, the amplitude decrease processing unit 38 decreases the amplitude of the vibration torque command value Tcv so that the vibration maximum value obtained by adding the amplitude of the vibration torque command value Tcv and the current torque deviation width ΔTshi to the basic torque command value Tcb coincides with the upper limit command value Tcmx.

Specifically, as shown in the equation (7), when the determination vibration maximum value (Tcb+Ab+ΔTshi) is larger than the upper limit command value Tcmx, the amplitude decrease processing unit 38 calculates an amplitude decrease coefficient Ka by dividing the deviation width subtraction difference value (Tcmx−Tcb−ΔTshi), which is obtained by subtracting the basic torque command value Tcb and the current torque deviation width ΔTshi from the upper limit command value Tcmx, by the basic amplitude Ab; and calculates the final vibration torque command value Tcv by multiplying the amplitude decrease coefficient Ka to the basic vibration torque command value Tcvb. On the other hand, when the determination vibration maximum value (Tcb+Ab+ΔTshi) is less than or equal to the upper limit command value Tcmx, the amplitude decrease processing unit 38 sets the basic vibration torque command value Tcvb to the final vibration torque command value Tcv directly.

1) In the case of $Tcb+Ab+\Delta Tshi > Tcmx$ $Ka=(Tcmx-Tcb-\Delta Tshi)/Ab$ $Tcv=Ka \times Tcvb$ 2) In the case of $Tcb+Ab+\Delta Tshi <= Tcmx$ $Tcv=Tcvb$ (7)

Alternatively, as shown in the equation (8), when the determination vibration maximum value (Tcb+Ab+ΔTshi) is larger than the upper limit command value Tcmx, the amplitude decrease processing unit 38 may use the deviation width subtraction difference value (Tcmx−Tcb−ΔTshi) instead of the basic amplitude Ab in the equation (1), and may calculate the final vibration torque command value Tcv directly.

1) In the case of $Tcb+Ab+\Delta Tshi > Tcmx$ $Tcv=(Tcmx-Tcb-\Delta Tshi) \times \sin(m \times \theta + \gamma)$ 2) In the case of $Tcb+Ab+\Delta Tshi <= Tcmx$ $Tcv=Ab \times \sin(m \times \theta + \gamma)$ (8)

In both cases of the equation. (7) and the equation (8), the amplitude decrease processing unit 38 lower-limits the deviation width subtraction difference value (Tcmx−Tcb−ΔTshi) by zero.

Other Embodiment

Lastly, other embodiments of the present disclosure will be explained. Each of the configurations of embodiments to be explained below is not limited to be separately utilized but can be utilized in combination with the configurations of other embodiments as long as no discrepancy occurs.

Figure 10:
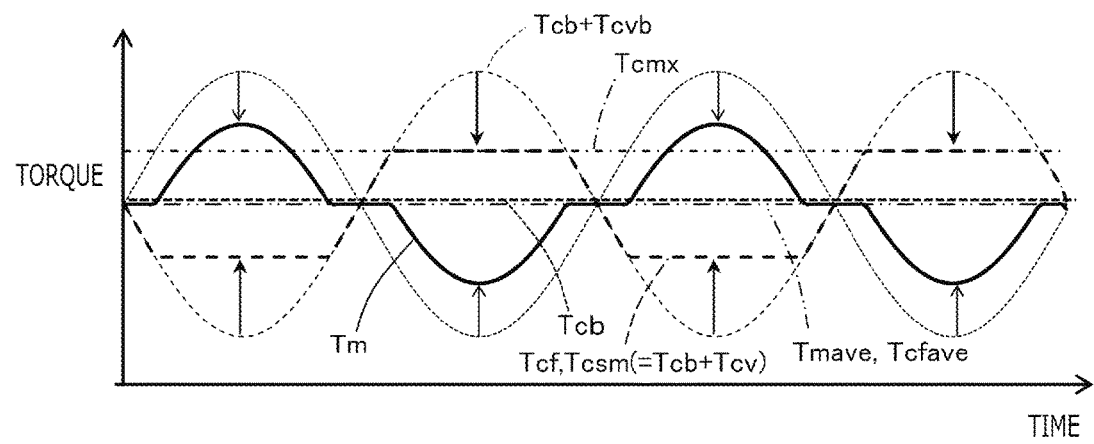
FIG. 10 is a time chart according to other embodiments of the present disclosure.

(1) In each of the above-mentioned Embodiments, there has been explained the case where the vibration command calculation unit 31 decreases the amplitude while maintaining a waveform of the basic vibration torque command value Tcvb in the amplitude decrease processing. However, embodiments of the present disclosure are not limited to the foregoing case. That is to say, when the vibration maximum value obtained by adding the amplitude of the vibration torque command value Tcv to the basic torque command value Tcb becomes larger than the upper-limit command value Tcmx, the vibration command calculation unit 31 should just decrease the amplitude of the vibration torque command value Tcv so that the vibration maximum value becomes less than or equal to the upper limit command value Tcmx, and the waveform may be changed before and after the amplitude decrease processing. For example, in Embodiment 1, as shown in the equation (9) and the time chart of FIG. 10, when the determination vibration maximum value (Tcb+Ab) obtained by adding the basic amplitude Ab of the basic vibration torque command value Tcvb to the basic torque command value Tcb is larger than the upper limit command value Tcmx, the vibration command calculation unit 31 may upper-limit the basic torque command value Tcb by the difference value ((Tcmx−Tcb) obtained by subtracting the basic torque command value Tcb from the maximum command value Tcmx, and may set a value obtained by lower-limiting the basic torque command value Tcb by a value obtained by multiplying −1 to the difference value (Tcmx−Tcb), to the final vibration torque command value Tcv.

1) In the case of $Tcb+Ab > Tcmx$ $-(Tcmx-Tcb) <= Tcvb <= (Tcmx-Tcb)$ $Tcv=Tcvb$ 2) In the case of $Tcb+Ab <= Tcmx$ $Tcv=Tcvb$ (9)

In Embodiment 2, the vibration command calculation unit 31 may upper and lower limit the basic torque command value Tcb by a plus value and a minus value of the deviation width subtraction difference value (Tcmx−Tcb−ΔTsh). In Embodiment 3, the vibration command calculation unit 31 may upper and lower limit the basic torque command value Tcb by a plus value and a minus value of the deviation width subtraction value (Tcmx−Tcb−ΔTshi).

Also according to this configuration, the amplitude of the vibration torque command value Tcv can be decreased so that the vibration maximum value becomes less than or equal to the upper limit command value Tcmx, and the average value Tcfave of the final torque command value Tcf and the average value Tmave of the output torque Tm of the rotary electric machine 2 can be prevented from becoming lower than the basic torque command value Tcb. Moreover, rather than each of the above embodiments, the amplitude of the vibration torque command value Tcv can be made to increase, and cancellation effect of the torque vibration can be improved.

(2) In each of the above-mentioned. Embodiments, there has been explained the case where the vibration command calculation unit 31 calculates the vibration torque command Tcv (the basic vibration torque command value Tcvb) of the sine wave (or cosine wave) waveform. However, embodiments of the present disclosure are not limited to the foregoing case. That is to say, the vibration command calculation unit 31 may calculate any waveform, as long as it is the vibration torque command value Tcv (the basic vibration torque command value Tcvb) which vibrates at the vibrational frequency. For example, the vibration command calculation unit 31 may set a waveform close to a vibration component of the output torque of the rotary electric machine 2 which was measured by a torque sensor in an experiment, to the waveform of the vibration torque command value Tcv (the basic vibration torque command value Tcvb). For example, the vibration command calculation unit 31 may calculate a unit command value, whose amplitude is 1, by combining a plurality of sine waves (or cosine waves) which are different in phase; or may calculate a unit command value corresponding to the electrical angle θ by using a table in which the relationship between the angle and the unit command value is preliminarily set. Then, the vibration command calculation unit 31 may calculate the basic vibration torque command value Tcvb by multiplying the basic amplitude Ab to the unit command value.

(3) In the above-mentioned Embodiment 1, there has been explained the case where the vibration command calculation unit 31 decreases the amplitude of the vibration torque command value Tcv so that the vibration maximum value coincides with the upper-limit command value Tcmx. However, embodiments of the present disclosure are not limited to the foregoing case. That is to say, the vibration command calculation unit 31 should just decrease the amplitude of the vibration torque command value Tcv so that the vibration maximum value becomes less than or equal to the upper limit command value Tcmx. For example, the vibration command calculation unit 31 may decrease the amplitude of the vibration torque command value Tcv so that the vibration maximum value coincides with a value obtained by subtracting a predetermined value from the upper limit command value Tcmx.

(4) In the above-mentioned Embodiment 2, there has been explained the case where as the deviation width between the final torque command value Tcf and the output torque of the actual rotary electric machine 2, the deviation width due to the torque current conversion map and the production variation is taken into consideration. In the above-mentioned Embodiment 3, there has been explained the case where as the deviation width between the final torque command value Tcf and the output torque of the actual rotary electric machine 2, the deviation width due to the current detection deviation is taken into consideration. However, embodiments of the present disclosure are not limited to the foregoing case. As the deviation width between the final torque command value Tcf and the output torque of the actual rotary electric machine 2, the deviation width due to various factors may be taken into consideration, and the deviation width due to both of the torque current conversion map and the production variation, and the current detection deviation may be taken into consideration.

(5) In each of the above-mentioned Embodiments, there has been explained the case where the vibration command calculation unit 31 calculates the vibration torque command value Tcv for canceling the torque vibration component such as the torque ripple and the cogging torque which the rotary electric machine 2 outputs. However, embodiments of the present disclosure are not limited to the foregoing case. The vibration command calculation unit 31 should just calculate the vibration torque command value Tcv which vibrates at the vibrational frequency. For example, the vibration command calculation unit 31 may calculate the vibration torque command value Tcv for canceling a shaft torsional vibration which occurs in a power transmission passage which connects the rotary electric machine 2 and the wheels 8, or may calculate the vibration torque command value icy for canceling both of the torque ripple and the cogging torque, and the shaft torsional vibration.

(6) In each of the above-mentioned Embodiments, there has been explained the case where the rotary electric machine 2 is used for the driving force source of the electric vehicle. However, embodiments of the present disclosure are not limited to the foregoing case. That is to say, the rotary electric machine 2 may be used for a driving force source of a hybrid vehicle equipped with an internal combustion engine, or may be used for a driving force source of an apparatus other than a vehicle.

(7) In each of the above-mentioned Embodiments, there has been explained the case where the rotary electric machine 2 is the permanent magnet type synchronous rotary electric machine. However, embodiments of the present disclosure are not limited to the foregoing case. That is to say, the rotary electric machine 2 may be various kinds of rotary electric machines, such as an induction rotary electric machine.

Various modifications and alterations of this disclosure will be apparent to those skilled in the art without departing from the scope and spirit of this disclosure, and it should be understood that this is not limited to the illustrative embodiments set forth herein.

INDUSTRIAL APPLICABILITY

The present disclosure can be preferably used for a controller of a rotary electric machine which superimposes a torque vibration component on output torque of the rotary electric machine.

REFERENCE SIGNS LIST

1: Controller of Rotary Electric Machine, 2: Rotary Electric Machine, 11: Current Sensor, 13: Temperature Sensor, 30: Basic Torque Command Calculation Unit, 31: Vibration Command Calculation Unit, 32: Final Torque Command Calculation Unit, Ab: Basic Amplitude, Ka: Amplitude Decrease Coefficient, Tcb: Basic Torque Command Value, Tcf: Final Torque Command Value, Tcfave: Average Value of Final Torque Command Value, Tcv: Vibration Torque Command Value, Tcvb: Basic Vibration Torque Command Value, Tcmx: Upper-limit Command Value, Tcsm: Addition Torque Command Value, Tm: Output Torque of Rotary Electric Machine, Tmave: Average Value of Output Torque of Rotary Electric Machine

What is claimed is:

1. A controller of a rotary electric machine comprising:
a basic torque command calculator that calculates a basic torque command value which is a basic command value of torque in which the rotary electric machine is made to output;
a vibration command calculator that calculates a vibration torque command value which is a torque command value which vibrates at a vibration frequency; and
a final torque command calculator that calculates an addition torque command value obtained by adding the vibration torque command value to the basic torque command value; and calculates a value obtained by upper-limiting the addition torque command value by an upper limit command value which is preliminarily set corresponding to a maximum output torque of the rotary electric machine, as a final torque command value to be commanded to the rotary electric machine finally,
wherein when a vibration maximum value obtained by adding an amplitude of the vibration torque command value to the basic torque command value becomes larger than the upper limit command value, the vibration command calculator decreases the amplitude of the vibration torque command value so that the vibration maximum value becomes less than or equal to the upper limit command value.

2. The controller of the rotary electric machine according to claim 1, wherein the vibration command calculator calculates, as the vibration maximum value, a value obtained by adding the amplitude of the vibration torque command value and a preliminarily set deviation width between the final torque command value and the output torque of the rotary electric machine, to the basic torque command value.

3. The controller of the rotary electric machine according to claim 2, wherein when a temperature of a current sensor which detects current flowing into the rotary electric machine is greater than or equal to a preliminarily set determination temperature, the vibration command calculator calculates a current torque deviation width, which is a deviation width between the final torque command value and an output torque of the rotary electric machine and is caused by current detection error of the current sensor; and calculates a value obtained by adding an amplitude of the vibration torque command value and the current torque deviation width to the basic torque command value, as the vibration maximum value.

4. The controller of the rotary electric machine according to claim 2, wherein the vibration command calculator decreases an amplitude of the vibration torque command value so that the vibration maximum value coincides with the upper limit command value.

5. The controller of the rotary electric machine according to claim 2, wherein the vibration command calculator performs low pass filter processing to a setting value of amplitude of the vibration torque command value.

6. The controller of the rotary electric machine according to claim 1, wherein when a temperature of a current sensor which detects current flowing into the rotary electric machine is greater than or equal to a preliminarily set determination temperature, the vibration command calculator calculates a current torque deviation width, which is a deviation width between the final torque command value and an output torque of the rotary electric machine and is caused by current detection error of the current sensor; and calculates a value obtained by adding the amplitude of the vibration torque command value and the current torque deviation width to the basic torque command value, as the vibration maximum value.

7. The controller of the rotary electric machine according to claim 6, wherein the vibration command calculator decreases an amplitude of the vibration torque command value so that the vibration maximum value coincides with the upper limit command value.

8. The controller of the rotary electric machine according to claim 6, wherein the vibration command calculator performs low pass filter processing to a setting value of amplitude of the vibration torque command value.

9. The controller of the rotary electric machine according to claim 1, wherein the vibration command calculator decreases the amplitude of the vibration torque command value so that the vibration maximum value coincides with the upper limit command value.

10. The controller of the rotary electric machine according to claim 9, wherein the vibration command calculator performs low pass filter processing to a setting value of amplitude of the vibration torque command value.

11. The controller of the rotary electric machine according to claim 1, wherein the vibration command calculator performs low pass filter processing to a setting value of the amplitude of the vibration torque command value.

* * * * *